United States Patent
Cyr et al.

(10) Patent No.: US 6,630,521 B2
(45) Date of Patent: Oct. 7, 2003

(54) ANTHRAQUINONE COLORANTS CONTAINING COPOLYMERIZABLE VINYL GROUPS

(75) Inventors: Michael John Cyr, Kingsport, TN (US); Max Allen Weaver, Kingsport, TN (US); Gerry Foust Rhodes, Piney Flats, TN (US); Jason Clay Pearson, Kingsport, TN (US); Jean Carroll Fleischer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 154 days.

(21) Appl. No.: 10/054,285

(22) Filed: Nov. 13, 2001

(65) Prior Publication Data

US 2003/0134924 A1 Jul. 17, 2003

(51) Int. Cl.$^7$ .................. C07C 225/34; C08F 220/18; G03C 1/73
(52) U.S. Cl. .................. 522/14; 522/18; 522/28; 522/16; 522/26; 522/96; 522/103; 522/107; 522/181; 522/182; 552/236; 552/237; 526/328; 526/328.5; 526/284
(58) Field of Search .................. 522/14, 18, 28, 522/96, 103, 107, 16, 26, 181, 182; 552/236, 237, 208; 526/328, 328.5, 284

(56) References Cited

U.S. PATENT DOCUMENTS

| | | | |
|---|---|---|---|
| 4,115,056 A | | 9/1978 | Koller et al. |
| 4,132,841 A | * | 1/1979 | Champenois ............... 526/221 |
| 4,943,617 A | | 7/1990 | Etzbach et al. |
| 5,055,602 A | | 10/1991 | Melpolder |
| 5,109,097 A | | 4/1992 | Klun et al. |
| 5,362,812 A | * | 11/1994 | Holmes et al. ............. 525/274 |
| 5,367,039 A | | 11/1994 | Yabuuchi et al. |
| 5,578,419 A | | 11/1996 | Itoh et al. |
| 6,294,591 B1 | * | 9/2001 | Blum et al. ................... 522/35 |
| 6,329,117 B1 | * | 12/2001 | Padmanaban et al. ... 430/270.1 |

FOREIGN PATENT DOCUMENTS

| | | |
|---|---|---|
| EP | 0322808 | 7/1989 |
| WO | WO 96/01283 | 1/1996 |
| WO | WO 97/48744 | 12/1997 |

OTHER PUBLICATIONS

Asquith et al, "Self–Coloured Polymers Based on Anthraquinone Residues", Journal of the Society of Dyes and Colourists (J.S.D.C.), Apr., 1977, pp. 114–125.

John Wiley & Sons, Chemistry & Technology of UV & EB Formulation for Coatings, Inks, and Paints, vol. II: Prepolymers and Reactive Diluents, G. Webster, London, 1997, pp. 35–250.

* cited by examiner

Primary Examiner—Susan W. Berman
(74) Attorney, Agent, or Firm—Michael J. Blake; Bernard J. Graves, Jr.

(57) ABSTRACT

Disclosed are thermally-stable, red, anthraquinone colorants which contain one or more ethylenically-unsaturated, photopolymerizable radicals and which may be copolymerized with ethylenically-unsaturated monomers to produce colored compositions such as colored acrylic polymers, colored polystyrenes, and similar colored polymeric materials derived from other ethylenically-unsaturated monomers. The compounds possess good stability to ultraviolet light, good solubility in vinyl monomers, good color strength and thermal stability. Also disclosed are acrylic polymeric materials, i.e., polymers derived from acrylic acid esters, methacrylic acid esters and/or other copolymerizable vinyl compounds, having copolymerized therein one or more of the colorant compounds of the present invention.

13 Claims, No Drawings

ANTHRAQUINONE COLORANTS CONTAINING COPOLYMERIZABLE VINYL GROUPS

FIELD OF THE INVENTION

This invention pertains to certain thermally-stable, red, anthraquinone colorants which contain one or more ethylenically-unsaturated (vinyl), photopolymerizable radicals which may be copolymewrized (or cured) with ethylenically-unsaturated monomers to produce colored compositions such as colored acrylic polymers, e.g., polymers produced from acrylate and methacrylate esters, colored polystyrenes, and similar colored polymeric materials derived from other ethylenically-unsaturated monomers. The compounds possess good fastness (stability) to ultraviolet (UV) light, good solubility in vinyl monomers, good color strength and thermal stability. The invention also includes acrylic polymeric materials, i.e., polymers derived from acrylic acid esters, methacrylic acid esters and/or other copolymerizable vinyl compounds, having copolymerized therein one or more of the colorant compounds of the present invention.

BACKGROUND AND PRIOR ART

It is known (J.S.D.C., April 1977, pp 114–125) to produce colored polymeric materials by combining a reactive polymer such terepolymers having epoxy groups or polyacryloyl chloride with anthraquinone dyes containing nucleophilic reactive groups such as amino or hydroxy groups; to graft acryloylaminoanthraquinone dyes to the backbone of vinyl or divinyl polymers; and to polymerize anthraquinone dyes containing certain olefinic groups to produce polymeric dyes/pigments. U.S. Pat. No. 4,115,056 describes the preparation of blue, substituted 1,4-diaminoanthraquinone dyes containing one acryloyloxy group and and the use of the dyes in coloring various fibers, especially polyamide fibers. U.S. Pat. No. 4,943,617 discloses liquid crystalline copolymers containing certain blue, substituted 1,5-diamino-4,8-dihydroxyanthraquinone dyes containing an olefinic group copolymerized therein to provide liquid crystal copolymers having high dichromism. U.S. Pat. No. 5,055,602 describes the preparation of certain substituted 1,4-diaminoanthraquinone dyes containing polymerizable acryloyl and methacryloyl groups and their use in coloring polyacrylate contact lens materials by copolymerizing.

U.S. Pat. No. 5,362,812 discloses the conversion of a variety of dye classes, including anthraquinones, into polymeric dyes by (a) polymerizing 2-alkenylazlactones and reacting the polymer with dyes containing nucleophilic groups and by (b) reacting a nucleophilic dye with an alkenylazlactone and then polymerizing the free radically polymerizable dyes thus produced. The polymeric dyes are reported to be useful for photoresist systems and for color-proofing. U.S. Pat. No. 5,367,039 discloses a process for preparing colored vinyl polymers suitable for inks, paints, toners and the like by emulsion polymerization of a vinyl monomer with reactive anthraquinone dyes prepared by functionalizing certain anthraquinone dyes with methacryloyl groups.

The preparation of a variety of dyes, including some anthraquinones, which contain photopolymerizable groups and their use for color filters suitable for use in liquid crystal television sets, color copying machines, photosensitive resist resin compositions, and the like are described in U.S. Pat. No. 5,578,419.

BRIEF SUMMARY OF THE INVENTION

One embodiment of the present invention concerns thermally-stable, photopolymerizable dye or colorant compounds having Formula I:

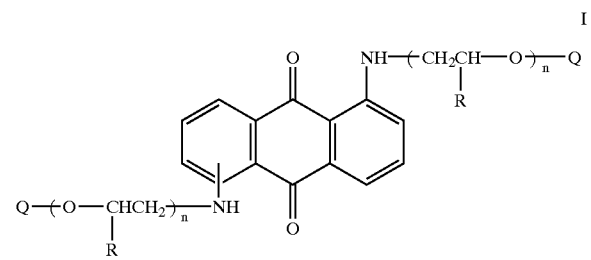

I wherein R is hydrogen or methyl, n is 2–3 and Q is a photopolymerizable group selected from organic radicals 1–9:

—COC($R_1$)=CH—$R_2$,  1

—CONHCOC($R_1$)=CH—$R_2$,  2

—CONH-$C_1$-$C_6$-alkylene OCOC($R_1$)=CH—$R_2$,  3

4

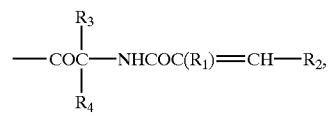

5

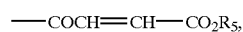

6

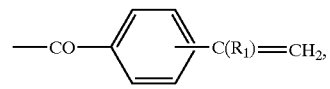

7

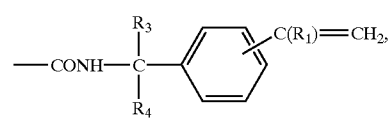

8

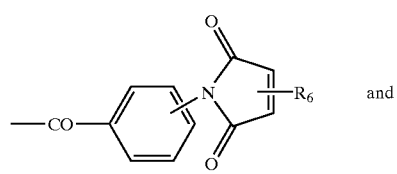

and

9

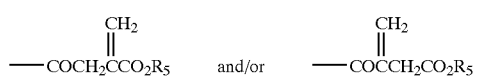

and/or wherein
$R_1$ is selected from hydrogen or $C_1$-$C_6$-alkyl;
$R_2$ is selected from hydrogen; $C_1$-$C_6$-alkyl; phenyl; phenyl substituted with one or more groups selected from $C_1$-$C_6$-alkyl, $C_1$-$C_6$-alkoxy, —N($C_1$-$C_1$-alkyl)$_2$, nitro, cyano, $C_2$-$C_6$-alkoxycarbonyl, $C_2$-$C_6$-alkanoyloxy and halogen; 1- and 2-naphthyl; 1- and 2-naphthyl substituted with $C_1$–$C_6$-alkyl or $C_1$–$C_6$-alkoxy; 2- and 3-thienyl; 2- and 3-thienyl substituted with $C_1$–$C_6$-alkyl or halogen; 2- and 3-furyl; and 2- and 3-furyl substituted with $C_1$–$C_6$-alkyl;

$R_3$ and $R_4$ are independently selected from hydrogen, $C_1$–$C_6$-alkyl, substituted $C_1$–$C_6$-alkyl and aryl; or $R_3$ and $R_4$ may be combined to represent a —(CH$_2$—)$_{3-5}$— radical;

$R_5$ is selected from hydrogen or a group selected from $C_1$–$C_6$-alkyl, substituted $C_1$–$C_6$-alkyl, $C_3$–$C_8$-alkenyl, $C_3$–$C_8$-cycloalkyl and aryl; and $R_6$ is selected from hydrogen, $C_1$–$C_6$ alkyl and aryl.

A second embodiment of the present invention pertains to a coating composition comprising (i) one or more polymerizable vinyl compounds, (ii) one or more of the thermally-stable, photopolymerizable dye or colorant compounds of Formula I, and (iii) a photoinitiator. A third embodiment of the present invention pertains to a polymeric composition, typically a coating, comprising a polymer of one or more acrylic acid esters, one or more methacrylic acid esters and/or other polymerizable vinyl compounds, having copolymerized therein one or more of the dye compounds of Formula I.

DETAILED DESCRIPTION OF THE INVENTION

The thermally-stable, photopolymerizable colorant compounds having Formula I constitutes the first embodiment of the present invention. The term "$C_1$–$C_6$-alkyl" is used herein to denote a straight- or branched-chain, saturated, aliphatic hydrocarbon radical containing one to six carbon atoms. The term "substituted $C_1$–$C_6$-alkyl" is used to denote a $C_1$–$C_6$-alkyl group substituted with one or more groups, preferably one to three groups, selected from the groups consisting of hydroxy, halogen, cyano, aryl, aryloxy, arylthio, $C_1$–$C_6$-alkylthio, $C_3$–$C_8$-cycloalkyl, $C_2$–$C_6$-alkanoyloxy and —(—O—$R_7$—)$_p$—$R_8$, wherein $R_7$ is selected from the group consisting of $C_1$–$C_6$-alkylene, $C_1$–$C_6$-alkylene-arylene, cyclohexylene, arylene, $C_1$–$C_6$-alkylene-cyclohexylene and $C_1$–$C_6$-alkylene-cyclohexylene-$C_1$–$C_6$-alkylene; and $R_8$ is selected from the group consisting of hydrogen, $C_1$–$C_6$-alkoxy, halogen hydroxy, carboxy, $C_2$–$C_6$-alkanoyloxy, $C_2$–$C_6$-alkoxycarbonyl, aryl, and $C_3$–$C_8$-cycloalkyl; and p is 1, 2, or 3.

The term "$C_1$–$C_6$-alkylene" is used to denote a straight- or branched-chain, divalent, hydrocarbon radical containing one to six carbon atoms which may be optionally substituted with one or two groups selected from $C_1$–$C_6$-alkoxy, $C_2$–$C_6$-alkanoyloxy, hydroxy, aryl and halogen. The terms "$C_1$–$C_6$-alkoxy", "$C_2$–$C_6$-alkoxycarbonyl" and "$C_2$–$C_6$-alkanoyloxy" are used to denote radicals corresponding to the structures —OR$_9$, —CO$_2$R$_9$, and —OCOR$_9$, respectively, wherein R$_9$ is $C_1$–$C_6$-alkyl or substituted $C_1$–$C_6$-alkyl. The term "$C_3$–$C_8$-alkenyl" is used to denote an aliphatic hydrocarbon radical containing at least one double bond and having three to eight carbon atoms.

The term "$C_3$–$C_8$-cycloalkyl" is used to denote a saturated, carbocyclic, hydrocarbon radical having three to eight carbon atoms, optionally substituted with at least one $C_1$–$C_6$-alkyl group. The term "halogen" is used to denote fluorine, chlorine, bromine and iodine. The term "aryl" is used to denote phenyl and phenyl substituted with one to three substituents selected from $C_1$–$C_6$-alkyl, $C_1$–$C_6$-alkoxy, $C_2$–$C_6$-alkoxycarbonyl and halogen.

The vinyl functionalized red colorants of Formula I are prepared by reacting the intermediate diol colorants of Formula II with acylating agents 1'–9':

ClCOC(R$_1$)=CH—R$_2$ORO[COC(R$_1$)=CH—R$_2$]$_2$,  1'

O=C=N—COC(R$_1$)=CH—R$_2$,  2'

O=C=N—C$_1$–C$_6$ alkylene OCOC(R$_1$)=CH—R$_2$,  3'

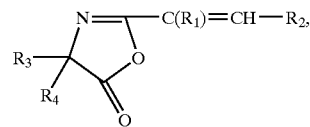  4'

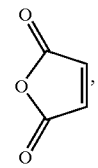  5'

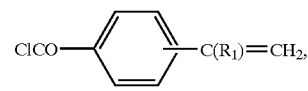  6'

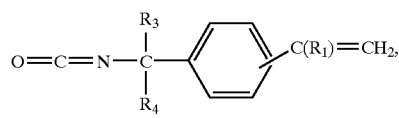  7'

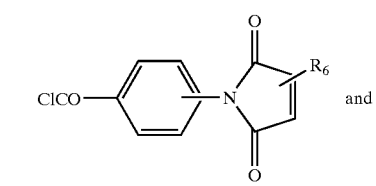  8'

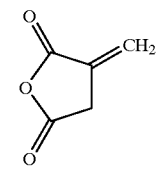  9' wherein $R_1$, $R_2$, $R_3$, $R_4$, and $R_6$ are as defined previously. Q preferably is a group having the formula —COC(R$_1$)=CH$_2$ or

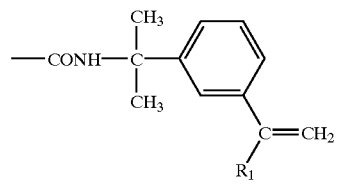

wherein $R_1$ is hydrogen or methyl.

Intermediate diol compounds having formula II preferably are prepared by reacting either 1,5-dichloro- or 1,8-dichloroanthraquinone with intermediate amino-ether-alkanols III:

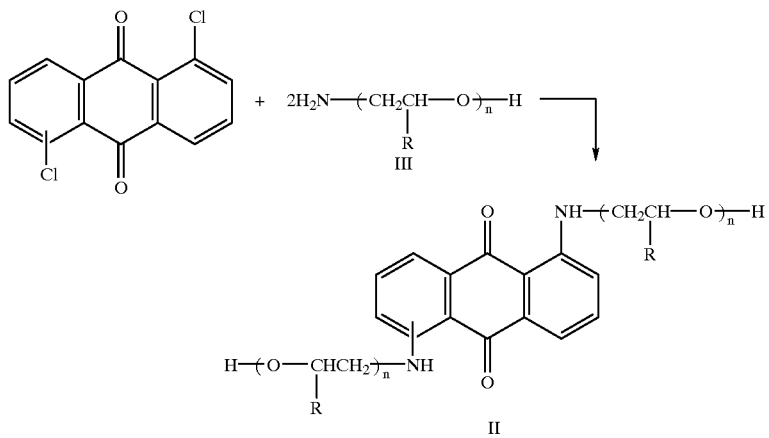

The reactions may be carried out by heating the dichloroanthraquinone intermediates with amines III at temperatures of from about 125° C. to about 165° C., preferably at from about 135° C. to about 150° C. The reactions are promoted by the presence of bases and an excess of intermediate III is efficacious; however, other bases such as alkali metal carbonates, alkali metal bicarbonates and tertiary amines are also useful. Although various solvents also may be used, ethylene glycol mono-$C_1$–$C_4$-alkyl ethers are particularly useful as solvents.

The anthraquinone colorant compounds of formula I which contain vinyl or substituted vinyl groups are polymerizable or copolymerizable, preferably by free radical mechanisms, said free radicals being generated by exposure to UV light by methods known in the art of preparing UV-cured resins. Polymerization can be facilitated by the addition of photoinitiators. The colored polymeric materials normally are prepared by dissolving the functionalized colorants containing copolymerizable groups in a polymerizable vinyl monomer with or without another solvent and then combining with an oligomeric or polymeric material which contains one or more vinyl or substituted vinyl groups.

The second embodiment of the present invention is a coating composition comprising (i) one or more polymerizable vinyl compounds, i.e., vinyl compounds which are copolymerizable with the colorant compounds of formula (I), (ii) one or more of the colorant compounds of formula (I), and (iii) at least one photoinitiator. The polymerizable vinyl compounds useful in the present invention contain at least one unsaturated group capable of undergoing polymerization upon exposure to UV radiation in the presence of a photoinitiator, i.e., the coating compositions are radiation-curable. Examples of such polymerizable vinyl compounds include acrylic acid, methacrylic acid and their anhydrides; crotonic acid; itaconic acid and its anhydride; cyanoacrylic acid and its esters; esters of acrylic and methacrylic acids such as allyl, methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; and diacrylate and dimethacrylate esters of ethylene and propylene glycols, 1,3-butylene glycol, 1,4-butanediol, diethylene and dipropylene glycols, triethylene and tripropylene glycols, 1,6-hexanediol, neopentyl glycol, polyethylene glycol, and polypropylene glycol, ethoxylated bisphenol A, ethoxylated and propoxylated neopentyl glycol; triacrylate and trimeth-acrylate esters of tris-(2-hydroxyethyl)isocyanurate, trimethylolpropane, ethoxylated and propoxylated trimethylolpropane, pentaerythritol, glycerol, ethoxylated and propoxylated glycerol; tetraacrylate and tetramethacrylate esters of pentaerythritol and ethoxylated and propoxylated pentaerythritol; acrylonitrile; vinyl acetate; vinyl toluene; styrene; N-vinyl pyrrolidinone; alpha-methylstyrene; maleate/fumarate esters; maleic/fumaric acid; crotonate esters, and crotonic acid.

The polymerizable vinyl compounds useful in the present invention include polymers which contain unsaturated groups capable of undergoing polymerization upon exposure to UV radiation in the presence of a photoinitiator. The preparation and application of these polymerizable vinyl compounds are well known to those skilled in the art as described, for example, in *Chemistry and Technology of UV and EB Formulation for Coatings, Inks, and Paints*, Volume II: Prepolymers and Reactive Diluents, G. Webster, editor, John Wiley and Sons, London, 1997. Examples of such polymeric, polymerizable vinyl compounds include acrylated and methacrylated polyesters, acrylated and methacrylated polyethers, acrylated and methacrylated epoxy polymers, acrylated or methacrylated urethanes, acrylated or methacrylated polyacrylates (polymethacrylates), and unsaturated polyesters. The acrylated or methacrylated polymers and oligomers typically are combined with monomers which contain one or more acrylate or methacrylate groups, e.g., monomeric acrylate and methacrylate esters, and serve as reactive diluents. The unsaturated polyesters, which are prepared by standard polycondensation techniques known in the art, are most often combined with either styrene or other monomers, which contain one or more acrylate or methacrylate groups and serve as reactive diluents. A second embodiment for the utilization of unsaturated polyesters that is known to the art involves the combination of the unsaturated polyester with monomers that contain two or more vinyl ether groups or two or more vinyl ester groups (WO 96/01283, WO 97/48744, and EP 0 322 808).

The coating compositions of the present invention optionally may contain one or more added organic solvents if desired to facilitate application and coating of the compositions onto the surface of substrates. Typical examples of suitable solvents include, but are not limited to ketones, alcohols, esters, chlorinated hydrocarbons, glycol ethers, glycol esters, and mixtures thereof. Specific examples include, but are not limited to acetone, 2-butanone, 2-pentanone, ethyl acetate, propyl acetate, isopropyl acetate, butyl acetate, isobutyl acetate, ethylene glycol diacetate, ethyl 3-ethoxypropionate, methyl alcohol, ethyl alcohol, propyl alcohol, isopropyl alcohol, butyl alcohol, ethylene glycol, propylene glycol, ethylene glycol monomethyl ether, ethylene glycol monoethyl ether, ethylene glycol monopropyl ether, ethylene glycol monobutyl glycol, diethylene glycol monomethyl ether, diethylene glycol monoethyl ether, diethylene glycol monobutyl ether, propylene glycol monomethyl ether, diethylene glycol monobutyl ether acetate, diethylene glycol monoethyl ether acetate, ethylene glycol monobutyl ether acetate, propylene glycol monomethyl ether acetate, methylene chloride, chloroform, and mixtures thereof. The amount of added or extraneous solvent which may be present in our novel coating compositions may be in the range of about 1 to 70 weight percent, more typically about 1 to 25 weight percent, based on the total weight of the coating composition.

Certain polymerizable vinyl monomers may serve as both reactant and solvent. These contain at least one unsaturated group capable of undergoing polymerization upon exposure to UV radiation in the presence of a photoinitiator. Specific examples include, but are not limited to: methacrylic acid, acrylic acid, ethyl acrylate and methacrylate, methyl acrylate and methacrylate, hydroxyethyl acrylate and methacrylate, diethylene glycol diacrylate, trimethylolpropane triacrylate, 1,6 hexanediol di(meth)acrylate, neopentyl glycol diacrylate and methacrylate, vinyl ethers, divinyl ethers such as diethyleneglycol divinyl ether, 1,6-hexanediol divinyl ether, cyclohexanedimethanol divinyl ether, 1,4-butanediol divinyl ether, triethyleneglycol divinyl ether, trimethylolpropane divinyl ether, and neopentyl glycol divinyl ether, vinyl esters, divinyl esters such as divinyl adipate, divinyl succinate, divinyl glutarate, divinyl 1,4-cyclohexanedicarboxylate, divinyl 1,3-cyclohexanedicarboxylate, divinyl isophthalate, and divinyl terephthalate, N-vinyl pyrrolidone, and mixtures thereof.

In addition, the compositions of the present invention may be dispersed in water rather than dissolved in a solvent to facilitate application and coating of the substrate surface. In the water-dispersed compositions of the present invention a co-solvent is optionally used. Typical examples of suitable cosolvents include but are not limited to acetone, 2-butanone, methanol, ethanol, isopropyl alcohol, ethylene glycol monomethyl ether, ethylene glycol monoethyl ether, ethylene glycol monopropyl ether, and ethylene glycol monobutyl ether, ethylene glycol, and propylene glycol. Typical examples of water-soluble ethylenically unsaturated solvents include but are not limited to: methacrylic acid, acrylic acid, N-vinyl-pyrrolidone, 2-ethoxyethyl acrylate and methacrylate, polyethylene glycol dimethacrylate, polypropylene glycol monoacrylate and monomethacrylate, and mixtures thereof. The amount of suitable aqueous organic solvent (i.e., organic solvent and water) in the dispersed coating compositions of the present invention is about 10 to about 90 weight percent, preferably about 75 to about 90 weight percent of the total coating composition.

The coating compositions of the present invention contain one or more of the reactive anthraquinone colorant compounds of formula I. The concentration of the colorant compound or compounds may be from about 0.005 to 30.0, preferably from about 0.05 to 15.0, weight percent based on the weight of the polymerizable vinyl compound(s) present in the coating composition, i.e., component (i) of the coating compositions. The coating compositions of the present invention normally contain a photoinitiator. The amount of photoinitiator typically is about 1 to 15 weight percent, preferably about 3 to about 5 weight percent, based on the weight of the polymerizable vinyl compound(s) present in the coating composition. Typical photoinitiators include benzoin and benzoin ethers such as marketed under the tradenames ESACURE BO, EB1, EB3, and EB4 from Fratelli Lamberti; VICURE 10 and 30 from Stauffer; benzil ketals such as 2,2-dimethoxy-1,2-diphenylethan-1-one (IRGACURE 651), 2-hydroxy-2-methyl-1-phenylpropan-1-one (IRGACURE 1173), 2-methyl-2-morpholino-1-(p-methylthiophenyl)propan-1-one (IRGACURE 907), alpha-hydroxyalkylphenones such as (1-hydroxycyclohexyl)(phenyl)methanone (IRGACURE 184), 2-benzyl-2-(dimethylamino)-1-(4-morpholinophenyl)butan-1-one (IRGACURE 369), 2-hydroxy-2-methyl-1-phenylpropan-1-one IRGACURE 1173) from Ciba Geigy, Uvatone 8302 by Upjohn; alpha, alpha-dialkoxyacetophenone derivatives such as DEAP and UVATONE 8301 from Upjohn; DAROCUR 116, 1173, and 2959 by Merck; and mixtures of benzophenone and tertiary amines In pigmented coating compositions, the rate of cure can be improved by the addition of a variety of phosphine oxide photoinitiaters such as bis(2,4,6-trimethylbenzoyl)-phenylphosphine oxide (Irganox 819), Irgacure 819, 1700, and 1700 and phosphine oxide mixtures such as a 50/50 by weight mixtures of IRGACURE 1173 and 2,4,6-trimethylbenzoyldiphenylphosphine oxide (DAROCUR 4265) from Ciba. Further details regarding such photoinitiators and curing procedures may be found in the published literature such as U.S. Pat. No. 5,109,097, incorporated herein by reference. Depending upon the thickness of the coating (film), product formulation, photoinitiator type, radiation flux, and source of radiation, exposure times to ultraviolet radiation of about 0.5 second to about 30 minutes (50–5000 mJ/square cm) typically are required for curing. Curing also can occur from solar radiation, i.e., sunshine.

The coating compositions of the present invention may contain one or more additional components typically present in coating compositions. Examples of such additional components include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; and/or coalescing agents. The coating compositions of the present invention also may contain non-reactive modifying resins. Typical non-reactive modifying resins include homopolymers and copolymers of acrylic and methacrylic acid; homopolymers and copolymers of alkyl esters of acrylic and methacrylic acid such as methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; acrylated and methacrylated urethane, epoxy, and polyester resins, silicone acrylates, cellulose esters such as cellulose acetate butyrates, cellulose acetate, propionates, nitrocellulose, cellulose ethers such as methyl cellulose, ethyl cellulose, hydroxypropyl cellulose, and hydroxypropyl methyl cellulose.

Typical plasticizers include alkyl esters of phthalic acid such as dimethyl phthalate, diethyl phthalate, dipropyl phthalate, dibutyl phthalate, and dioctyl phthalate; citrate esters such as triethyl citrate and tributyl citrate; triacetin and tripropionin; and glycerol monoesters such as Eastman 18-04, 18-07, 18-92 and 18-99 from Eastman Chemical Company. Specific examples of additional additives can be found in *Raw Materials Index,* published by the National Paint & Coatings Association, 1500 Rhode Island Avenue, N.W., Washington, D.C. 20005.

The third embodiment of the present invention pertains to a polymeric composition, typically a polymeric coating, comprising a polymer of one or more acrylic acid esters, one or more methacrylic acid esters and/or other polymerizable vinyl compounds, having copolymerized therein one or more of the anthraquinone colorant compounds of formula I. The colored polymeric compositions provided by our invention may be prepared from the coating compositions described above and typically contain from about 0.005 to 30.0 weight percent, preferably from about 05 to 15.0 weight percent, of the reactive or polymerized residue of one or more of the colorant compounds of formula (II) based on the weight of the composition or coating. The novel polymeric coatings may have a thickness of about 2.5 to 150 microns, more typically about 15 to 65 microns.

The polymeric coatings of the present invention typically have a solvent resistance of at least 100 MEK double rubs using ASTM Procedure D-3732; preferably a solvent resistance of at least about 200 double rubs. Such coatings also typically have a pencil hardness of greater than or equal to F using ASTM Procedure D-3363; preferably a pencil hardness of greater than or equal to H. The coating compositions can be applied to substrates with conventional coating equipment. The coated substrates are then exposed to radiation such as ultraviolet light in air or in nitrogen which gives a cured finish. Mercury vapor or Xenon lamps are applicable for the curing process. The coatings of the present invention can also be cured by electron beam.

The radiation-curable coating compositions of this invention are suitable as adhesives and coatings for such substrates as metals such as aluminum and steel, plastics, glass, wood, paper, and leather. On wood substrates the coating compositions may provide both overall transparent color and grain definition. Various aesthetically-appealing effects can be achieved thereby. Due to reduced grain raising and higher film thicknesses, the number of necessary sanding steps in producing a finished wood coating may be reduced when using the colored coating compositions of the invention rather than conventional stains. Coating compositions within the scope of our invention may be applied to automotive base coats where they can provide various aesthetically-appealing effects in combination with the base coats and color differences dependent on viewing angle (lower angles create longer path lengths and thus higher observed color intensities). This may provide similar styling effects as currently are achieved with metal flake orientation in base coats.

Various additional pigments, plasticizers, and stabilizers may be incorporated to obtain certain desired characteristics in the finished products. These are included in the scope of the invention.

EXAMPLES

The anthraquinone colorant compounds and coating compositions provided by the present invention are further illustrated by the following examples.

Example 1

A mixture of 1,5-dichloroanthraquinone (62.0 g, 0.223 mol), 2-(2-aminoethoxy)ethanol (100 g, 0.95 mol), and 2-ethoxyethanol (275 mL) was heated and stirred at about 135° C. for about 22.0 hours. The reaction mixture was allowed to cool and solid formation began at about 100° C., whereupon methanol (250 mL) was added dropwise, allowing the temperature to decrease to about 35–40° C. The thick slurry was filtered by vacuum filtration and the dark red solid was thoroughly washed with methanol and dried in air (yield 68.8 g, 74.5% of the theoretical yield). Field desorption mass spectrum analysis (FDMS) supported the following structure:

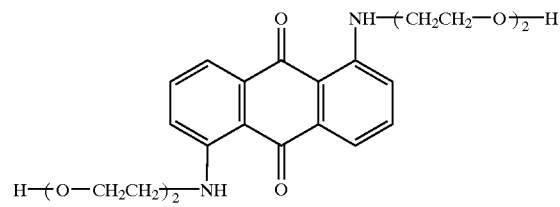

An absorption maximum at 511 nm was observed in the UV-visible light absorption spectrum in tetrahydrofuran (THF).

Example 2

A portion of the red diol colorant of Example 1 (4.14 g, 0.01 mol), 5 g (0.025 mol) of 3-isopropenyl-α,α-dimethylbenzyl isocyanate, toluene (30.0 mL) and 5 drops of dibutyltin dilaurate were stirred and heated at about 60° C. under nitrogen. After about 6.0 hours, thin-layer chromatography (TLC) showed that most of the diol had reacted, but some mono reacted product was present. An additional 1 mL of 3-isopropenyl-α,α-dimethylbenzyl isocyanate was added and heating and stirring were continued at about 85° C. for about 8.0 hours. TLC showed essentially a single spot for product. Heptane (60 mL) was added dropwise with continued heating. After being stirred for about 1.0 hour at about 80–85° C., the stirred reaction mixture was allowed to cool to room temperature and the red solid product was collected by filtration, washed with hexane and dried in air (yield 8.1 g, 99.3% of the theoretical yield). FDMS supported the following structure:

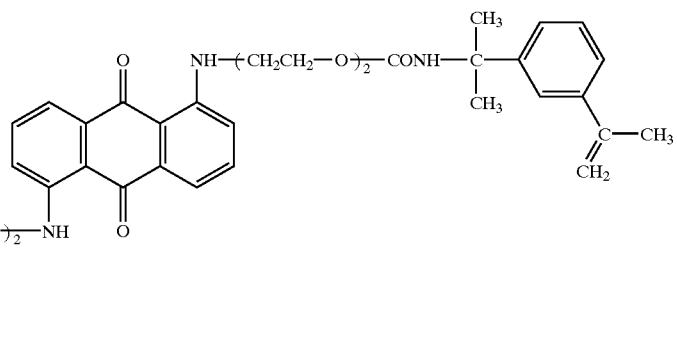

An absorption maximum was observed at 511 nm in the UV-Visible light absorption spectrum in THF.

Example 3

A mixture of 1,5-dichloroanthraquinone (139.0 g, 0.50 mol), triethylene glycol monoamine (312.9 g, 2.1 mol), and 2-ethoxyethanol (550 mL) was heated and stirred for about 24.0 hours at about 135° C. The reaction mixture was allowed to cool to about 50° C., whereupon a considerable amount of solid product had crystallized. Isopropanol (500 mL) was added dropwise rapidly, allowing temperature to drop to room temperature. The red product was collected by nitrogen for about 20 hours. TLC showed complete reaction. Heptane (50 mL) was added dropwise while still heating. Stirring and heating at about 80° C. were continued for about an hour and then the mixture was allowed to stand overnight at room temperature. The red solid was collected by filtration, washed with heptane and dried in air (yield 9.0 g, 99.2% of the theoretical yield). FDMS supported the following structure:

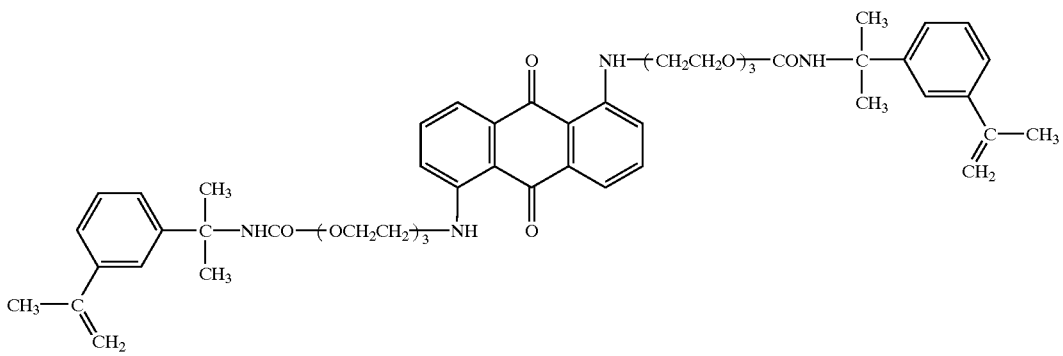

vacuum filtration, washed with isopropanol (400 mL) and then with methanol (200 mL). After drying in air, the product weighed 161 g (64.1% of the theoretical yield). FDMS supported the following structure:

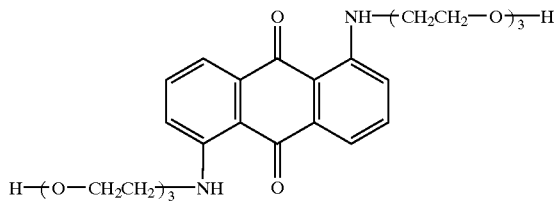

An absorption maximum at 511 nm was observed in the UV-Visible light absorption spectrum in THF.

Example 4

A portion (5.02 g, 0.01 mol) of the diol colorant of Example 3, 3-isopropenyl-α,α-dimethylbenzyl isocyanate (5 g, 0.025 mol), toluene (35 mL) and dibutyltin dilaurate (6 drops) were mixed and heated with stirring at 80° C. under An absorption maximum at 512 nm was observed in the UV-Visible light absorption spectrum in THF.

Example 5

A portion of the diol colorant from Example 3 (7.0 g, 0.014 mol), acetone (50 mL), 4-dimethylaminopyridine (2.0 g), triethylamine (25.0 g) and hydroquinone monomethyl ether (0.5 g) were mixed and heated with stirring to 60–65° C. Methacrylic anhydride (15.0 g, 0.097 mol) was added dropwise over 30 minutes and heating was continued for 30 minutes. Heat was removed and water (200 mL) was added dropwise over a 1.0 hour period. The product separated as an oil and adhered to the flask. The aqueous portion was decanted off and the oily product was dissolved in acetone/methanol mixture. Upon drowning this solution into water and stirring overnight, a solid product was obtained which was collected by filtration, washed with water and dried in air. The product had the following structure by FDMS:

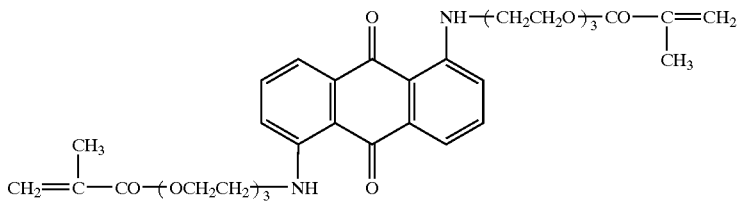

An absorption maximum at 511 nm was observed in the UV-Visible light absorption spectrum in THF.

Example 6

A portion of the diol colorant from Example 1 (10.0 g, 0.024 mol), methacrylic anhydride (25.0 g, 0.16 mol), N,N-dimethylformamide (40 g), triethylamine (25 g), 4-dimethylaminopyridine (2 g) and mono t-butylhydroquinone (0.5 g) were mixed and heated and stirred at about 60° C. for 1.0 hour. TLC (5:1 v/v, ethylacetate:heptane) indicated complete reaction. Heat was removed and water (250 mL) was added dropwise to the reaction mixture with stirring, allowing the temperature to drop. The precipitated red solid was collected by filtration, washed with water and dried in air. It had the following structure as evidenced by FDMS:

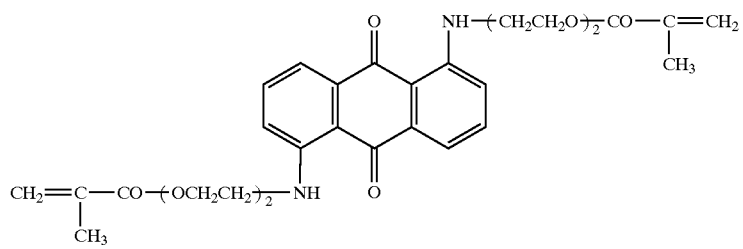

An absorption maximum was observed at 511 nm in the UV-Visible light absorption spectrum in THF.

Example 7

A mixture of 1,8-dichloroanthraquinone (27.7 g, 0.10 mol), 2-(2-aminoethoxy)ethanol (45.2 g, 0.42 mol) and 2-ethoxyehtanol (140 mL) was heated and stirred at about 135° C. for about 21 hours. TLC (75/25 THF/cyclohexane) showed mostly product, but a small amount of starting material and some mono reacted product remained. Additional 2-(2-amino-ethoxy)ethanol (10.5 g, 0.10 m) was added and heating continued for about 20 hours. The reaction mixture was allowed to cool and methanol (250 mL) was added dropwise with stirring. The precipitated product was collected by filtration, washed with methanol and dried in air (yield 8.7 g, 21% of the theoretical yield). FDMS supported the following structure:

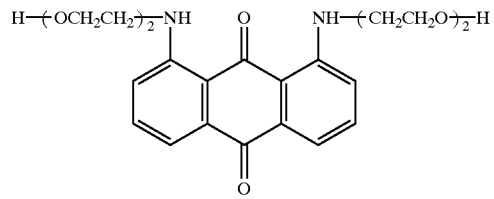

An absorption maximum at 538 nm was observed in the UV-Visible spectrum in THF.

Example 8

A portion of the diol colorant from Example 7 (4.14 g, 0.01 mol), toluene (35 mL) 3-isopropenyl-α,α-dimethylbenzyl isocyanate (5.0 g, 0.025 mol) and dibutyltin dilaurate (6 drops) was heated and stirred under nitrogen at about 85° C. for 3.5 hrs. While stirring, heptane (50 mL) was added at about 80–85° C. with heat still on. After allowing to cool gradually to room temperature, the reaction mixture was filtered by vacuum filtration and the dark red solid was washed with heptane and dried in air (yield 7.5 g, 92% of the theoretical yield). FDMS supported the following structure:

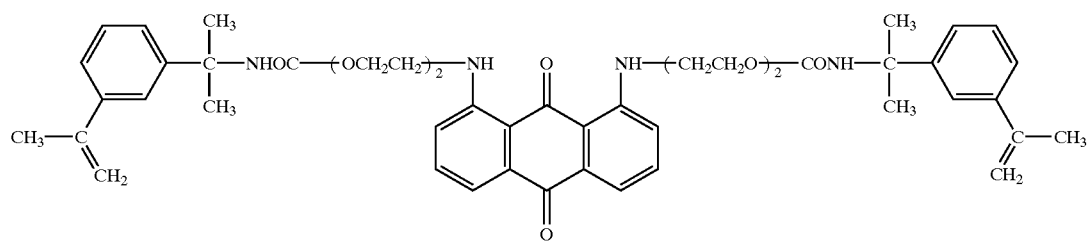

An absorption maximum at 538 nm was observed in the UV-Visible absorption spectrum in THF.

Additional examples (Examples 9–34) of the anthraquinone colorant compounds of formula (I) are presented in Tables I and II.

TABLE I

Photopolymerizable Substituted 1,5-Diaminoanthraquinone Colorants

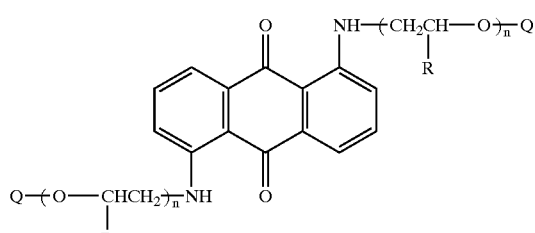

| Example No. | R | n | Q |
|---|---|---|---|
| 9 | H | 2 | —COCH=CH$_2$ |
| 10 | H | 3 | —COCH=CH$_2$ |
| 11 | H | 2 | —COCH=CH—CH$_3$ |
| 12 | H | 2 | —COCH=CH—C$_6$H$_5$ |

TABLE I-continued

Photopolymerizable Substituted 1,5-Diaminoanthraquinone Colorants

[Structure: 1,5-diaminoanthraquinone with Q—(O—CHCH$_2$)$_n$—NH substituents at 1 and 5 positions, with R on CHCH$_2$]

| Example No. | R | n | Q |
|---|---|---|---|
| 13 | H | 2 | —COC(CH$_3$)=CH—[furan] |
| 14 | H | 2 | —COCH=CH—[thiophene] |
| 15 | H | 3 | —CONHCOC(CH$_3$)=CH$_2$ |
| 16 | CH$_3$ | 2 | —COC(CH$_3$)=CH$_2$ |
| 17 | CH$_3$ | 2 | —CONHC(CH$_3$)$_2$—C$_6$H$_4$-3-C(CH$_3$)=CH$_2$ |
| 18 | CH$_3$ | 3 | —COCH=CH$_2$ |
| 19 | CH$_3$ | 3 | —COCH=CH—CO$_2$H |
| 20 | CH$_3$ | 2 | —COCH=CH—CO$_2$H |
| 21 | H | 2 | —CO-C$_6$H$_4$-4-CH=CH$_2$ |
| 22 | H | 3 | —CO—[C$_6$H$_4$-N-maleimide] |

TABLE II

Photopolymerizable Substituted 1,8-Diaminoanthraquinone Compounds

[Structure: 1,8-diaminoanthraquinone with Q—(O—CHCH$_2$)$_n$—NH substituents at 1 and 8 positions, with R on CHCH$_2$]

| Example No. | R | n | Q |
|---|---|---|---|
| 22 | H | 2 | —COC(CH$_3$)=CH$_2$ |
| 23 | H | 3 | —COC(CH$_3$)=CH$_2$ |
| 24 | H | 3 | —CONHC(CH$_3$)$_2$-C$_6$H$_4$-3-C(CH$_3$)=CH$_2$ |
| 25 | H | 2 | —COCH=CH$_2$ |
| 26 | H | 3 | —COCH=CH$_2$ |
| 27 | H | 2 | —COCH$_2$C(CO$_2$CH$_3$)=CH$_2$ |
| 28 | CH$_3$ | 2 | —COC(CH$_3$)=CH$_2$ |
| 29 | CH$_3$ | 2 | —CONHC(CH$_3$)$_2$-C$_6$H$_4$-3-C(CH$_3$)=CH$_2$ |
| 30 | CH$_3$ | 2 | —CONH—CH$_2$CH$_2$—OCOC(CH$_3$)=CH$_2$ |
| 31 | CH$_3$ | 3 | —COC(CH$_3$)$_2$NHCOC(CH$_3$)=CH$_2$ |
| 32 | H | 2 | —COC(CH$_3$)$_2$NHCOC(CH$_3$)=CH$_2$ |
| 33 | H | 3 | —CO—[C$_6$H$_4$-N-(3-methylmaleimide)] |
| 34 | H | 2 | —CONHC(CH$_3$)$_2$-C$_6$H$_4$-4-CH=CH$_2$ |

Samples of the coating compositions may be used to coat glass plates using a knife blade. The wet film thickness typically is about 15 to 75 microns (0.6 to 3.0 mils). Any solvent present is evaporated to give a clear, somewhat tacky film. Prior to exposure to UV radiation, each film is readily soluble in organic solvents. The dried film on the glass plate is exposed to UV radiation from a 200 watt per inch medium pressure mercury vapor lamp housed in an American Ultraviolet Company instrument using a belt speed of 25 ft. per minute. One to five passes under the lamp normally provides a crosslinked coating with maximum hardness and solvent resistance.

Each cured coating (film) may be evaluated for Konig Pendulum Hardness (ASTM D4366 DIN 1522), solvent resistance by the methyl ethyl ketone double-rub test, and solubility in acetone before and after exposure to UV radiation. The damping time for Konig Pendulum Hardness on uncoated glass is 250 seconds; coatings with hardness above 100 seconds are generally considered hard coatings. The methyl ethyl ketone (MEK) double rub test is carried out in accordance with ASTM Procedure D-3732 by saturating a piece of cheese cloth with methyl ethyl ketone, and with moderate pressure, rubbing the coating back and forth. The number of double rubs is counted until the coating is removed. The acetone solubility test is carried out by immersing a dry, pre-weighed sample of the cured film in acetone for 48 hours at 25° C. The film is removed, dried for 16 hours at 60° C. in a forced-air oven, and reweighed. The weight percent of the insoluble film remaining is calculated from the data.

The coatings and coating compositions provided by the present invention and the preparation thereof are further illustrated by the following example. A colored, photopolymerizable composition was prepared by thoroughly mixing 0.5 g the red colorant of Example 2 with a coating composition consisting of 20 g Jägalux UV1500 polyester acrylate, 10 g of bisphenol A epoxy acrylate, 9 g dipropyleneglycol diacrylate (DPGDA), 7 g trimethylolpropane triacrylate (TMPTA), and 4 g of Darocure 1173 photoinitiator using a small Cowles mixer until the components were completely dispersed. The resulting coating composition containing 1% of the red colorant compound is drawn down with a wire wound rod to provide a 25.4 micron (1 mil) thick coating on an oak wood panel. This panel is passed through a UV cure machine at a speed of 6.1 meters per minute (20 feet/minute) using a lamp with an intensity of 118.1 watts per cm (300 watts per inch). Konig Pendulum Hardness measurements (ASTM D4366 DIN 1522) conducted on the coated panel typically show no significant loss of hardness due to incorporation of the dye.

The invention has been described in detail with particular reference to preferred embodiments thereof, but it will be understood that variations and modifications can be effected within the spirit and scope of the invention.

We claim:

1. An anthraquinone colorant compound having the formula:

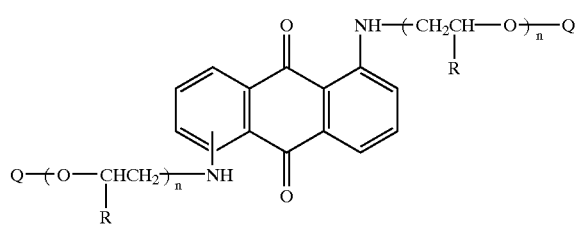

I wherein R is hydrogen or methyl, n is 2 or 3 and Q is a photopolymerizable group selected from the group consisting of organic radicals 1–9:

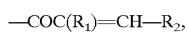  1

  2

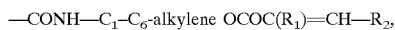  3

4

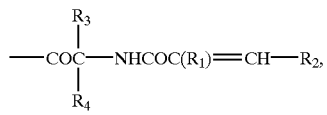

5

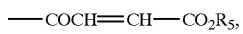  6

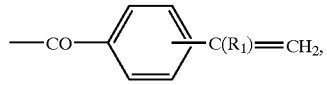

7

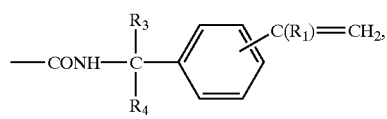

8

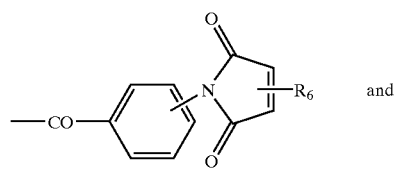   and

9

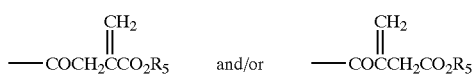

wherein
$R_1$ is hydrogen or $C_1$–$C_6$-alkyl;
$R_2$ is hydrogen; $C_1$–$C_6$-alkyl; phenyl; phenyl substituted with one or more groups selected from $C_1$–$C_6$-alkyl, $C_1$–$C_6$-alkoxy, —N($C_1$–$C_6$-alkyl)$_2$, nitro, cyano, $C_2$–$C_6$-alkoxycarbonyl, $C_2$–$C_6$-alkanoyloxy or halogen; 1- or 2-naphthyl; 1- or 2-naphthyl substituted with $C_1$–$C_6$-alkyl or $C_1$–$C_6$-alkoxy; 2- or 3-thienyl; 2- or 3-thienyl substituted with $C_1$–$C_6$-alkyl or halogen; 2- or 3-furyl; or 2- or 3-furyl substituted with $C_1$–$C_6$-alkyl;
$R_3$ and $R_4$ are independently selected from hydrogen, $C_1$–$C_6$-alkyl, substituted $C_1$–$C_6$-alkyl or aryl; or $R_3$ and $R_4$ may be combined to represent a —(CH$_2$—)$_{3-5}$— radical;
$R_5$ is hydrogen, $C_1$–$C_6$-alkyl, substituted $C_1$–$C_6$-alkyl, $C_3$–$C_8$-alkenyl, $C_3$–$C_8$-cycloalkyl or aryl; and
$R_6$ is hydrogen, $C_1$–$C_5$ alkyl or aryl.

2. An anthraquinone colorant compound according to claim 1 wherein Q is a group having the formula —COC($R_1$)=CH$_2$ or

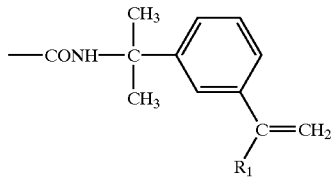

wherein $R_1$ is hydrogen or methyl.

3. An anthraquinone compound according to claim 1 having the formula:

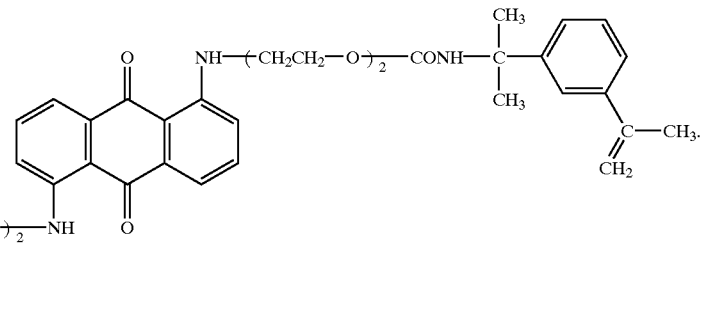

4. An anthraquinone compound according to claim 1 having the formula:

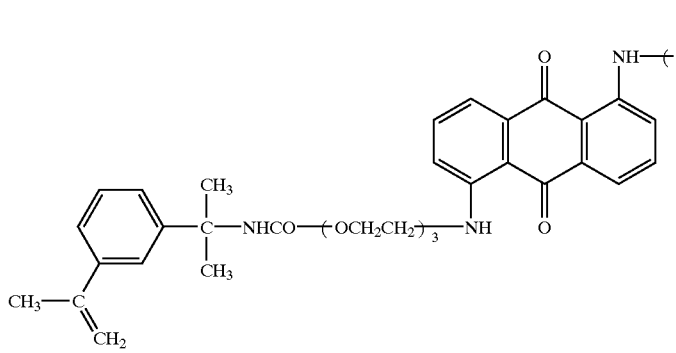

5. An anthraquinone compound according to claim 1 having the formula:

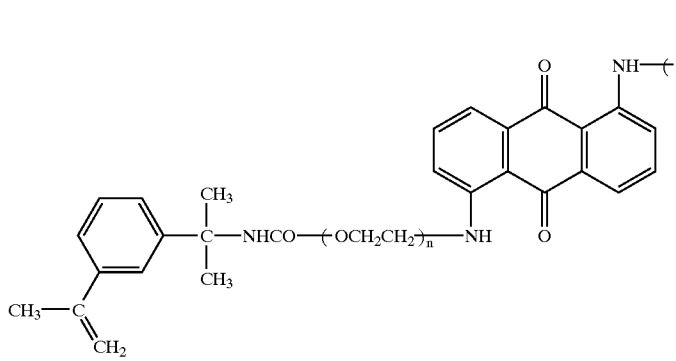

wherein n is 2 or 3.

6. An anthraquinone compound according to claim 1 having the formula:

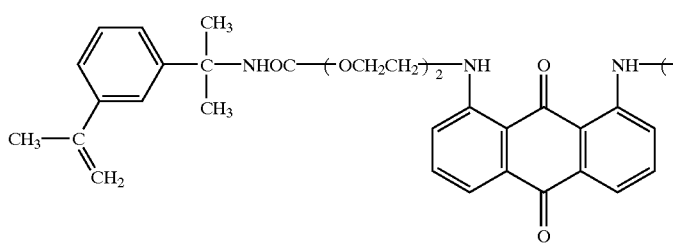

7. A coating composition comprising (i) one or more polymerizable vinyl compounds, (ii) one or more of the colorant compounds according to claim 1, and (iii) at least one photoinitiator.

8. A coating composition according to claim 7 comprising (i) one or more polymerizable vinyl compounds, (ii) one or more of the colorant compounds present in a concentration of about 0.05 to 15 weight percent based on the weight of component (i), and (iii) a photoinitiator present in a concentration of about 1 to 15 weight percent based on the weight of the polymerizable vinyl compound(s) present in the coating composition.

9. A coating composition according to claim 8 wherein the polymerizable vinyl compounds comprise a solution of a polymeric, polymerizable vinyl compound selected from acrylated or methacrylated polyesters, acrylated or methacrylated polyethers, acrylated or methacrylated epoxy polymers-, acrylated or methacrylated urethanes, or mixtures thereof, in a diluent selected from monomeric acrylate or methacrylate esters.

10. A polymeric coating composition comprising a polymer of one or more acrylic acid esters, one or more methacrylic acid esters and/or other copolymerizable vinyl compounds, having copolymerized therein one or more colorant compounds having the formula:

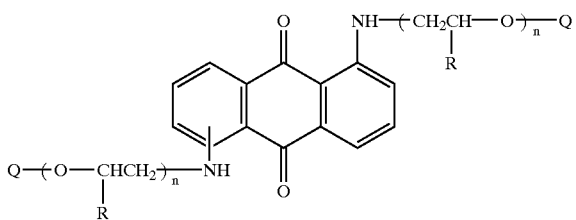

wherein R is hydrogen or methyl, n is 2 or 3 and Q is a photopolymerizable group selected from the group consisting of organic radicals 1–9:

—COC($R_1$)=CH—$R_2$,  1

—CONHCOC($R_1$)=CH—$R_2$,  2

—CONH—$C_1$–$C_6$-alkylene OCOC($R_1$)=CH—$R_2$,  3

4
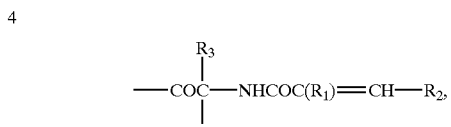

5
—COCH=CH—$CO_2R_5$,  6

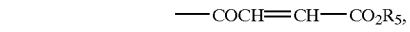

7
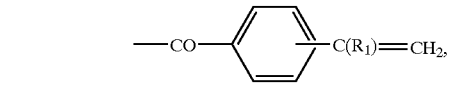

8
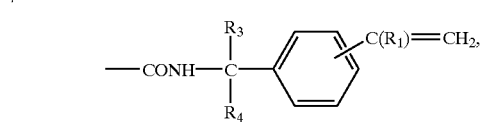
and

9
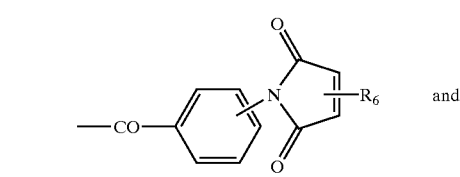

wherein $R_1$ is hydrogen or $C_1$–$C_6$-alkyl;

$R_2$ is hydrogen; $C_1$–$C_6$-alkyl; phenyl; phenyl substituted with one or more groups selected from $C_1$–$C_6$-alkyl, $C_1$–$C_6$-alkoxy, —N($C_1$–$C_6$-alkyl)$_2$, nitro, cyano, $C_2$–$C_6$-alkoxycarbonyl, $C_2$–$C_6$-alkanoyloxy or halogen; 1- or 2-naphthyl; 1- or 2-naphthyl substituted with $C_1$–$C_6$-alkyl or $C_1$–$C_6$-alkoxy; 2- or 3-thienyl; 2- or 3-thienyl substituted with $C_1$–$C_6$-alkyl or halogen; 2- or 3-furyl; or 2- or 3-furyl substituted with $C_1$–$C_6$-alkyl;

$R_3$ and $R_4$ are independently selected from hydrogen, $C_1$–$C_6$-alkyl, substituted $C_1$–$C_6$-alkyl or aryl; or $R_3$ and $R_4$ may be combined to represent a —(CH$_2$—)$_{3-5}$— radical;

$R_5$ is hydrogen, $C_1$–$C_6$-alkyl, substituted $C_1$–$C_6$-alkyl, $C_3$–$C_8$-alkenyl, $C_3$–$C_8$-cycloalkyl or aryl; and $R_6$ is selected from hydrogen, $C_1$–$C_6$ alkyl or aryl.

11. A polymeric coating composition according to claim 10 comprising an acrylic polymer of one or more acrylic acid esters, one or more methacrylic acid esters or a mixture thereof having copolymerized therein one or more of the colorant compounds defined in claim 10.

12. A polymeric coating composition according to claim 10 comprising an unsaturated polyester containing one or more maleate/fumarate residues; one or more monomers which contain one or more vinyl ether groups, one or more vinyl ester groups, or a combination thereof, and, optionally, one or more acrylic or methacrylic acid esters; or a mixture thereof having copolymerized therein one or more of the colorant compounds defined in claim 10.

13. A polymeric coating composition according to claim 12 wherein the residue of one or more colorant compounds is present at from about 0.05 to 15.0 weight percent based on the weight of the coating composition.

* * * * *

UNITED STATES PATENT AND TRADEMARK OFFICE
CERTIFICATE OF CORRECTION

PATENT NO.   : 6,630,521 B2
DATED        : October 7, 2003
INVENTOR(S)  : Cyr et al.

It is certified that error appears in the above-identified patent and that said Letters Patent is hereby corrected as shown below:

Column 18,
Line 36, "$C_1$-$C_5$" should read -- $C_1$-$C_6$ --.

Column 22,
Line 27, "$R_6$ is selected from hydrogen, $C_1$-$C_6$ alkyl or aryl." should be -- $R_6$ is hydrogen, $C_1$-$C_6$ alkyl or aryl. --

Signed and Sealed this

Twenty-fifth Day of November, 2003

JAMES E. ROGAN
*Director of the United States Patent and Trademark Office*